Patented June 30, 1942

2,287,774

UNITED STATES PATENT OFFICE 2,287,774

RUBBERLIKE MATERIALS

Reginald George Robert Bacon, Bernard James Habgood, and Rowland Hill, Blackley, Manchester, England, assignors to Imperial Chemical Industries Limited, a corporation of Great Britain No Drawing. Application February 28, 1940, Serial No. 321,351. In Great Britain March 8, 1939

17 Claims. (Cl. 260—79)

This invention relates to the manufacture of rubber-like materials of improved oil and solvent-resistance from synthetic rubber-like materials.

By synthetic rubber-like materials are meant the products having rubber-like properties, which are obtained by the polymerisation of butadiene-1:3 or substitution products of butadiene-1:3, such as 2-chloro-butadiene-1:3 and methyl- and dimethyl-butadienes-1:3, either alone or in conjunction with lesser quantities of other unsaturated substances which will interpolymerise with them. Examples of these synthetic rubber-like materials are the products which are sold under the name Neoprene.

According to the invention the new rubber-like materials are obtained by treating synthetic rubber-like materials with a minor proportion of dithiocyanogen so that interaction takes place.

The new rubber-like materials are distinguished from the old by having improved resistance to oils and solvents, especially improved resistance to hydrocarbon solvents such as benzene. Many of the synthetic rubber-like materials have much higher resistance to oils and solvents than rubber and this enables them to be used for many purposes for which rubber is unsuitable. By means of the present invention the synthetic rubber-like materials which have high resistance to oils and solvents are converted to products which have even higher resistance, while those having only moderate resistance, which are mostly the ones which are most readily and inexpensively synthesised, are converted to ones with higher resistance.

By minor proportions of dithiocyanogen are meant proportions such that there becomes chemically combined with the synthetic rubber-like material not more than will yield a product which still possesses rubber-like properties, and in any case not more than about 40% of that which would be chemically combined if there were complete saturation, that is to say if all the free ethylenic linkages became saturated. The quantity of dithiocyanogen to be used depends to some extent upon the particular synthetic rubber-like material which is treated. However, in general a noticeable improvement in oil and solvent resistance is obtained when the synthetic rubber-like material is heated with dithiocyanogen in quantity such that there becomes chemically combined enough to give about 5% saturation. With 15–20% saturation a great improvement in oil and solvent-resistance is usually obtained, and while still further improvement is obtained with higher saturation, in general too much diminution in rubber-like properties takes place with more than about 30–40% saturation.

The process of making modified rubbers is not confined to a process where dithiocyanogen alone is used. Small proportions of dithiocyanogen can be replaced by other substances which will react with the synthetic rubber-like material, e. g. halogens and hydrohalides. The use of such other substances is not necessary for increasing the oil and solvent resistance, but such use will result in products having slightly different properties. Where other substances are used they may be brought into interaction with the synthetic rubber-like materials at any convenient stage, for instance before the treatment with the dithiocyanogen.

The rubber-like products obtained by the treatment with the dithiocyanogen are in general tough resilient products having the improved oil and solvent-resistance referred to above. The uncured products are suitable for use as oil-resistant pigment bearing diluents for synthetic rubber-like materials.

Vulcanisation can in general be effected by the addition of the vulcanising agents used in curing the synthetic rubber-like materials themselves and then heating. Softeners, plasticisers and peptisers may be used along with the rubber-like materials, as also may be reinforcing ingredients and fillers. The products of the invention may be used alone or in admixture with rubber or synthetic rubber-like materials.

The invention accordingly includes a process for the manufacture of rubber-like materials which comprises treating synthetic rubber-like materials, which are obtained by the polymerisation of butadiene-1:3 or substitution products of butadiene-1:3, such as 2-chlorobutadiene-1:3 and methyl- and dimethyl-butadienes, either alone or in conjunction with lesser quantities of other unsaturated substances which will polymerise with them, with dithiocyanogen in quantity suitable to yield a rubber-like material and so that the amount which becomes chemically combined with the synthetic rubber-like material, is not in excess of 40% of that which would be combined if there were complete saturation.

The invention also includes the process of vulcanising the rubber-like materials obtained by the aforesaid process, and also the products of the two processes.

The treatment with the dithiocyanogen is carried out conveniently in a liquid which dissolves the rubber-like material or at least causes it to swell, and the dithiocyanogen is conveniently brought into reaction in the form of a solution in the same liquid or in another liquid such that the two solutions are readily miscible.

Since polymerisation takes place readily in dithiocyanogen solutions, the solutions should be used preferably when freshly prepared. If they are not freshly prepared they should have been kept under conditions where little or no polymerisation takes place, e. g. cold, in the dark, and with the dithiocyanogen at low concentration in the solution.

In a convenient way of carrying the invention into practical effect the synthetic rubber-like material is dissolved in a suitable solvent and stirred, while the dithiocyanogen, which is also in solution, is stirred in so as to obtain a homogeneous mixture. Reaction takes place readily, usually without heating, i. e. at 15–25° C. in an internal mixer. Reaction may be regarded as substantially complete when there is no further marked change in the physical characteristics of the mix (e. g. its viscosity). When reaction is complete the solvent is removed, for instance by drying in a vacuum oven or by treating with steam.

Inexpensive easily-recoverable organic solvents, which do not interact with dithiocyanogen or the synthetic rubber-like starting materials under the conditions used, e. g. benzene and carbon tetrachloride, should be used. In cases where the starting rubber-like materials are known to be rendered more plastic by the addition of peptising agents such as thio-β-naphthol, a treatment with one of these agents may be conveniently given as a preliminary.

The following examples, in which parts are by weight, illustrate but do not limit the invention.

*Example 1*

A solution of 100 parts of Neoprene (polymerised 2-chlorobutadiene-1:3) in 800 parts of benzene is mixed at about 15° C. with a solution of 20 parts of freshly prepared dithiocyanogen in 380 parts of benzene. After 1 hour, by which time the mixture has set to a limp orange-brown gel, the solvent is conveniently removed in a vacuum drying oven. The residual product, which is a tough rubbery mass, is milled into sheets on a roller mill. 119 parts of product in sheet form are obtained. This milled product is orange-brown in colour, very tough, but elastic, and is found on analysis to contain 3.75% of nitrogen, corresponding to the addition of 0.14 molecule of dithiocyanogen per molecular unit of 2-chlorobutadiene-1:3.

*Example 2*

The product obtained in Example 1 was made up into the following mix:

|  | Parts |
|---|---|
| Product from Example 1 | 100 |
| Magnesium oxide | 10 |
| Wood rosin | 5 |
| Phenyl-α-naphthylamine | 2 |
| Cottonseed oil | 5 |
| Channel black | 35 |
| Sulphur | 1 |
| Zinc oxide | 10 |

The mix was vulcanised at 141° C. for 1 hour. The vulcanisate was slightly harder than that obtained with untreated Neoprene, but had a superior resistance to Diesel oil, swelling only 28% compared with 55% in the case of an untreated control. The vulcanisate also had a superior resistance to benzene.

*Example 3*

A solution of 100 parts of synthetic rubber-like material, made by the polymerisation of butadiene in the presence of sodium, in 800 parts of benzene, is mixed at about 15° C. with 400 parts of a benzene solution containing 33 parts of freshly prepared dithiocyanogen. Reaction occurs within a hour, leading to the formation of a limp orange-coloured gel which becomes stiffer after keeping for a few hours. The product is allowed to stand overnight and is then dried and sheeted as described in Example 1. An extremely tough but elastic product is obtained which is found on analysis to contain 6.55% of nitrogen, corresponding with the addition of 0.17 molecule of dithiocyanogen per molecular unit of butadiene.

*Example 4*

The product obtained from Example 3 was made up in the following mix:

|  | Parts |
|---|---|
| Product from Example 3 | 100 |
| Magnesium oxide | 10 |
| Stearic acid | 2 |
| Pine tar | 4 |
| Channel black | 40 |
| Sulphur | 2 |
| Mercaptobenzthiazole | 0.75 |

The mix was vulcanised by heating for 1 hour at 141° C. A somewhat hard rubbery product was formed. This product when compared with a vulcanisate made under similar conditions from the same polymerised butadiene, which has not been treated with dithiocyanogen, by immersion in pure benzene, showed less than 50% of the swelling of the untreated control. Similarly when compared by immersion in Diesel oil at 70° C. the product swelled to the extent of 57% of its own volume, as compared with 300%.

*Example 5*

100 parts of synthetic rubber-like material made by interpolymerising butadiene with styrene in the proportion of 7 parts of the former to 3 of the latter are brought into solution by working in a dough mixer with 1000 parts of benzene and 25 parts of dibutyl thiodiglycollate. The solution is stirred at 20° C. with 300 parts of a benzene solution containing 22.2 parts of dithiocyanogen, so that a homogeneous mixture results. Gel formation begins within an hour and is allowed to proceed for 20 hours. The benzene is then removed from the product by heating it at 60° C. in a vacuum oven. There remains a tough but elastic rubber material.

*Example 6*

The following mixing was made up:

|  | Parts |
|---|---|
| Product of Example 5 | 100 |
| Magnesium oxide | 10 |
| Stearic acid | 2 |
| Pine tar | 4 |
| Channel black | 40 |
| Sulphur | 3 |
| Mercaptobenzthiazole | 0.75 |

After curing for 30 minutes at 141° C. the vulcanisate had the following physical properties

| | |
|---|---|
| Tensile strength kg./cm.² | 118 |
| Elongation at break per cent | 273 |
| Shore hardness | 78 |
| Shore elasticity | 55 |
| Resilience per cent | 57.4 |
| Increase in volume upon 168 hours immersion in Diesel oil at 70° C., per cent of initial volume | 64 |
| Increase in volume upon 48 hours immersion in benzene at 15° C., per cent of initial volume | 147 |

A sample of the unmodified interpolymer of butadiene and styrene was compounded to the same formula, vulcanised and tested, when the following results were obtained:

| | |
|---|---|
| Tensile strength kg./cm.² | 150 |
| Elongation at break per cent | 285 |
| Shore hardness | 72 |
| Shore elasticity | 60 |
| Resilience per cent | 57.7 |
| Increase in volume upon 168 hours immersion in Diesel oil at 70° C., per cent of initial volume | 154 |
| Increase in volume upon 48 hours immersion in benzene at 15° C., per cent of initial volume | 298 |

Resilience was measured on an instrument as described by Barnett & Matthews, Ind. & Eng. Chem. 1934, 26, 1292, and is expressed as a percentage energy return.

We claim:

1. Process for the manufacture of rubber-like materials, having higher resistance to oils and solvents than natural rubber, which comprises reacting a polymeric material, of the group consisting of polymers of butadiene-1,3, polymers of 2-chlorobutadiene-1,3, polymers of 2-methylbutadiene-1,3, polymers of 2,3-dimethylbutadiene-1,3, and interpolymers of said dienes with lesser quantities of other unsaturated substances which will polymerize with them, with from about 5 per cent to about 40 per cent of the amount of dithiocyanogen necessary to saturate completely said polymeric material.

2. Process for the manufacture of rubber-like materials, having higher resistance to oils and solvents than natural rubber, which comprises dissolving a polymeric material, of the group consisting of polymers of butadiene-1,3, polymers of 2-chlorobutadiene-1,3, polymers of 2-methylbutadiene-1,3, polymers of 2,3-dimethylbutadiene-1,3, and interpolymers of said dienes with lesser quantities of other unsaturated substances which will polymerize with them, in a solvent therefor, dissolving dithiocyanogen in a solvent therefor, which is miscible with the solvent for the polymeric material, and reacting said polymeric material with from about 5 per cent to about 40 per cent of the amount of dithiocyanogen necessary to saturate completely said polymeric material by mixing the reactants in solution.

3. Process of claim 2 further characterized in that the rubber-like material is compounded and vulcanized.

4. Process for the manufacture of rubber-like materials, having higher resistance to oils and solvents than natural rubber, which comprises reacting a synthetic rubber-like diene polymer of the group consisting of polymers of butadiene-1,3, polymers of 2-chlorobutadiene-1,3, polymers of 2-methylbutadiene-1,3, and polymers of 2,3-dimethylbutadiene-1,3 with from about 5 per cent to about 40 per cent of the amount of dithiocyanogen necessary to completely saturate the said polymer.

5. Process for the manufacture of rubber-like materials, having higher resistance to oils and solvents than natural rubber, which comprises reacting a polymer of 2-chlorobutadiene-1,3 with from about 5 per cent to about 40 per cent of the amount of dithiocyanogen necessary to completely saturate the said polymer.

6. Process for the manufacture of rubber-like materials, having higher resistance to oils and solvents than natural rubber, which comprises reacting a polymer of 2-chlorobutadiene-1,3 with from about 15 per cent to about 20 per cent of the amount of dithiocyanogen necessary to completely saturate the said polymer.

7. Process for the manufacture of rubber-like materials, having higher resistance to oils and solvents than natural rubber, which comprises dissolving a polymer of 2-chlorobutadiene-1,3 in a solvent therefor, dissolving dithiocyanogen in a solvent therefor which is miscible with the polymer solvent, and reacting the said polymer with from about 5 per cent to about 40 per cent of the amount of dithiocyanogen necessary to completely saturate the said polymer by mixing the reactants in solution.

8. Process for the manufacture of rubber-like materials, having higher resistance to oils and solvents than natural rubber, which comprises dissolving a polymer of 2-chlorobutadiene-1,3 in a solvent therefor, dissolving dithiocyanogen in a solvent therefor which is miscible with the polymer solvent, and reacting the said polymer with from about 15 per cent to about 20 per cent of the amount of dithiocyanogen necessary to completely saturate the said polymer by mixing the reactants in solution.

9. Process of claim 8 further characterized in that the rubber-like material is compounded and vulcanized.

10. A rubber-like material comprising a synthetic rubber-like polymeric material, of the group consisting of polymers of butadiene-1,3, polymers of 2-chlorobutadiene-1,3, polymers of 2-methylbutadiene-1,3, polymers of 2,3-dimethylbutadiene-1,3, and interpolymers of said dienes with lesser quantities of other unsaturated substances which will polymerize with them, having, in chemical combination therewith, from about 5 per cent to about 40 per cent of the amount of dithiocyanogen necessary to saturate completely said polymeric material.

11. A vulcanized rubber-like material comprising a synthetic rubber-like polymeric material, of the group consisting of polymers of butadiene-1,3, polymers of 2-chlorobutadiene-1,3, polymers of 2-methylbutadiene-1,3, polymers of 2,3-dimethylbutadiene-1,3, and interpolymers of said dienes with lesser quantities of other unsaturated substances which will polymerize with them, having, in chemical combination therewith, from about 5 per cent to about 40 per cent of the amount of dithiocyanogen necessary to saturate completely said polymeric material.

12. A rubber-like material comprising a synthetic rubber-like polymeric material, of the group consisting of polymers of butadiene-1,3, polymers of 2-chlorobutadiene-1,3, polymers of 2-methylbutadiene-1,3, polymers of 2,3-dimethylbutadiene-1,3, and interpolymers of said dienes with lesser quantities of other unsaturated substances which will polymerize with them, having, in chemical combination therewith, from about 15 per cent to about 20 per cent of the amount of dithiocyanogen necessary to saturate completely said polymeric material.

13. A vulcanized rubber-like material comprising a synthetic rubber-like polymeric material, of the group consisting of polymers of butadiene-1,3, polymers of 2-chlorobutadiene-1,3, polymers of 2-methylbutadiene-1,3, polymers of 2,3-dimethylbutadiene-1,3, and interpolymers of said dienes with lesser quantities of other unsaturated substances which will polymerize with them, having, in chemical combination therewith, from about 15 per cent to about 20 per cent of the amount of dithiocyanogen necessary to saturate completely said polymeric material.

14. A rubber-like material comprising a polymer of 2-chlorobutadiene-1,3 having, in chemical combination therewith, from about 5 per cent to about 40 per cent of the amount of dithiocyanogen necessary to completely saturate the said polymer.

15. A rubber-like material comprising a polymer of 2-chlorobutadiene-1,3 having, in chemical combination therewith, from about 15 per cent to about 20 per cent of the amount of dithiocyanogen necessary to completely saturate the said polymer.

16. A vulcanized rubber-like material comprising a polymer of 2-chlorobutadiene-1,3, having, in chemical combination therewith, from about 5 per cent to about 40 per cent of the amount of dithiocyanogen necessary to completely saturate the said polymer.

17. A vulcanized rubber-like material comprising a polymer of 2-chlorobutadiene-1,3 having, in chemical combination therewith, from about 15 per cent to about 20 per cent of the amount of dithiocyanogen necessary to completely saturate the said polymer.

REGINALD GEORGE ROBERT BACON.
BERNARD JAMES HABGOOD.
ROWLAND HILL.